United States Patent [19]

Saligny

[11] 4,260,856

[45] Apr. 7, 1981

[54] DISTRIBUTOR

[75] Inventor: Yves Saligny, Cluses, France

[73] Assignee: Etablissements Carpano & Pons, France

[21] Appl. No.: 50,505

[22] Filed: Jun. 20, 1979

[30] Foreign Application Priority Data

Jul. 13, 1978 [FR] France .................... 78 21629

[51] Int. Cl.³ .............................................. H04Q 1/14
[52] U.S. Cl. ........................................................ 179/98
[58] Field of Search ............... 179/98, 91 R; 361/426, 361/427, 428, 429

[56] References Cited

U.S. PATENT DOCUMENTS

| 3,780,351 | 12/1973 | Salmon et al. | 179/98 |
| 3,927,277 | 12/1975 | Wuyts et al. | 361/429 |
| 3,955,868 | 5/1976 | Kindermann et al. | 179/98 |
| 4,002,856 | 1/1977 | Sedlacer et al. | 179/98 |

FOREIGN PATENT DOCUMENTS

| 2315485 | 10/1974 | Fed. Rep. of Germany | 179/98 |
| 2431262 | 1/1976 | Fed. Rep. of Germany | 361/428 |
| 2608604 | 9/1977 | Fed. Rep. of Germany | 361/428 |

Primary Examiner—Gerald L. Brigance
Attorney, Agent, or Firm—Robert E. Burns; Emmanuel J. Lobato; Bruce L. Adams

[57] ABSTRACT

This telephone exchange distributor accessible from only one face, namely the front face, comprises vertical rows of connecting blocks and horizontal rows of distribution strips. Between every other or every adjacent pairs of connecting blocks an interval is left for a horizontal row of strips, and the plurality of horizontal rows of strips constitute the front face of the distributor. The rows of blocks are disposed between the rows of strips and parallel thereto. The wiring is facilitated by the provision of guideways for the jumpers, which extend vertically behind hooks and horizontally and longitudinally on the top face of brackets rigid with vertical frame members supporting the blocks. The brackets extends forward and carry at their front end the strips, and the jumpers extend also horizontally under other hooks. A guideway is provided in the frame members for the cable containing the incoming line wires, and another guideway is provided vertically in the frame members for the cable containing the outgoing wire lines.

9 Claims, 2 Drawing Figures

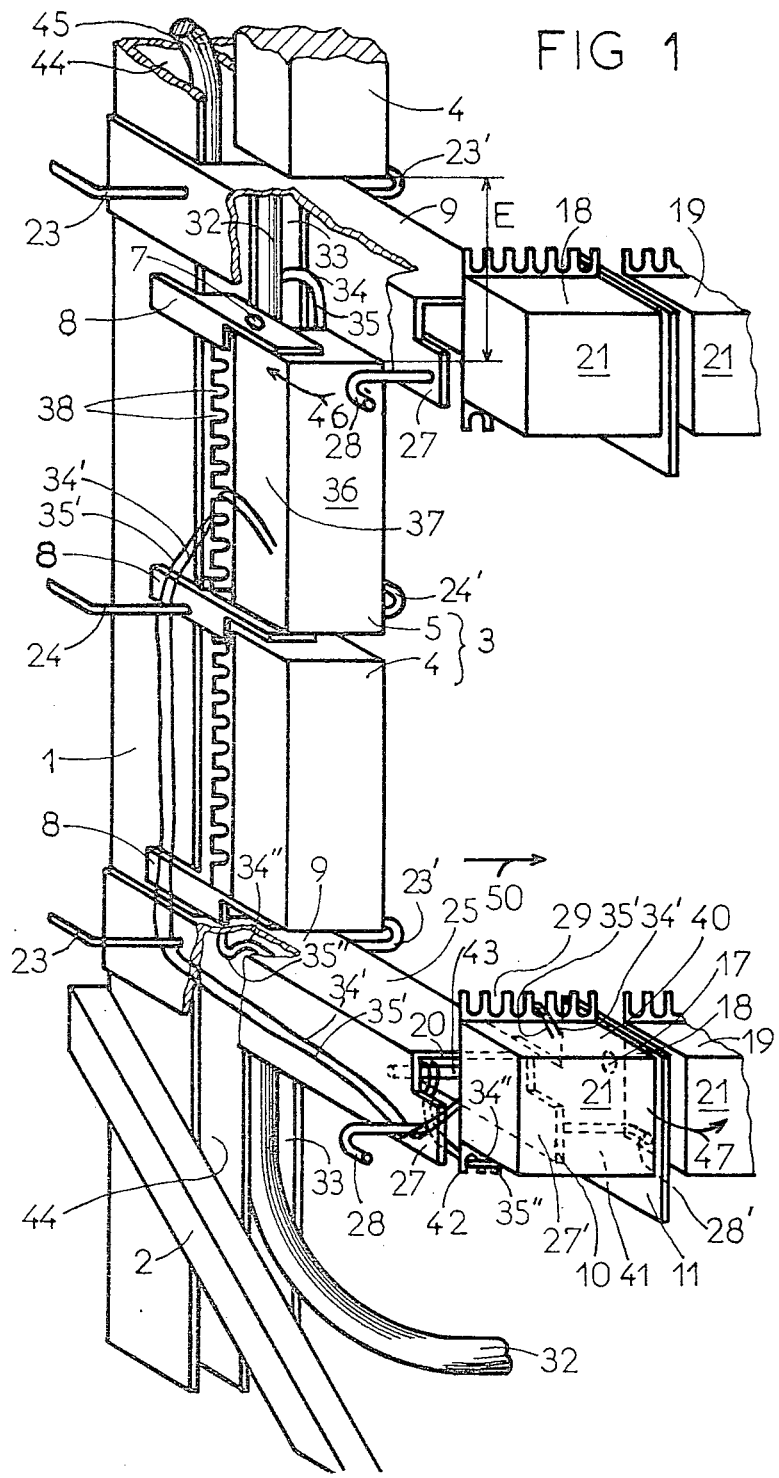

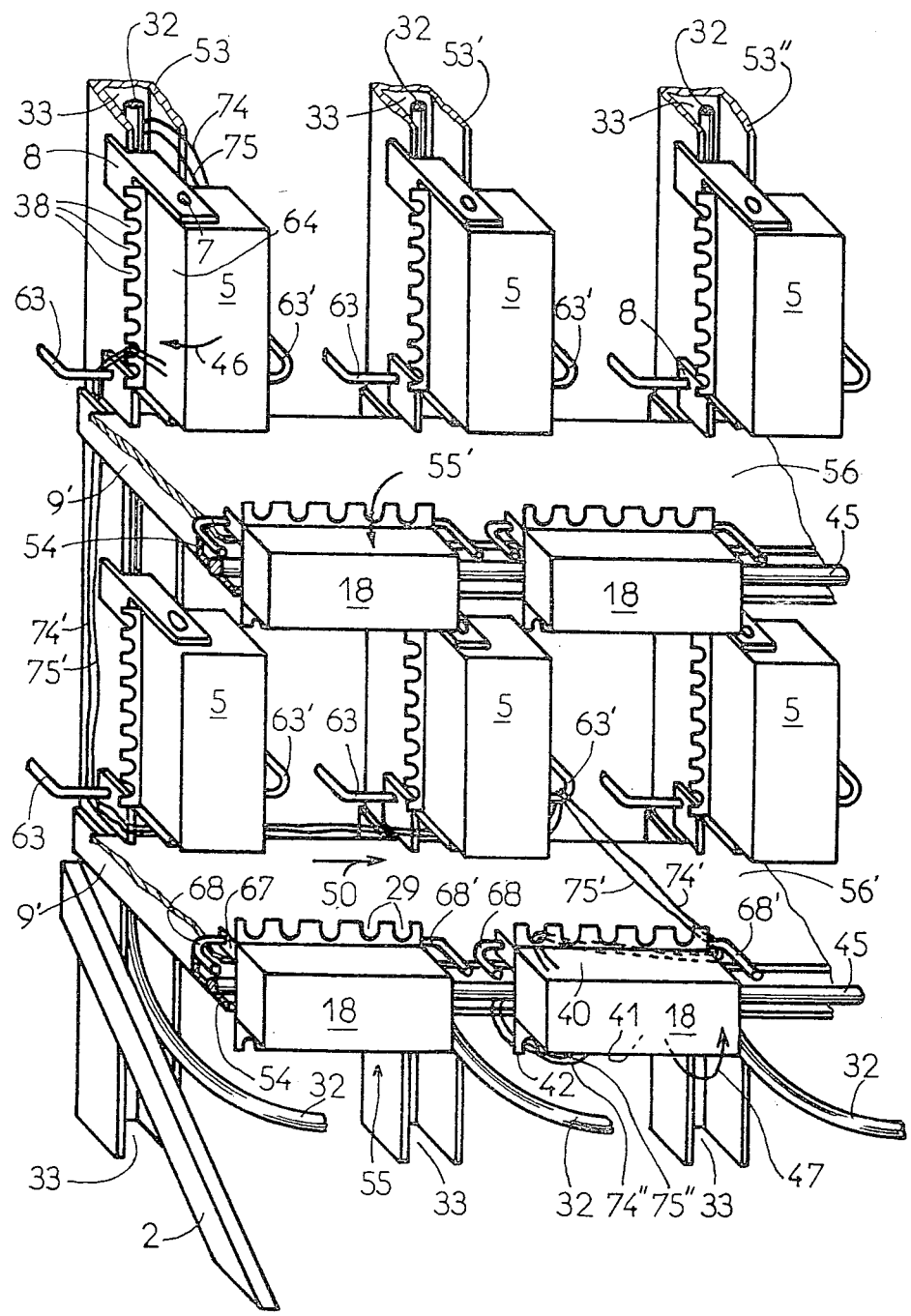

DISTRIBUTOR

FIELD OF THE INVENTION

This invention relates to distributors to which access can be had only from one face, namely the front face, for telephone exchanges, of the type comprising aligned blocks for interconnecting the incoming lines, which are disposed vertically, and aligned distribution strips, disposed horizontally, or vice versa: guideways are provided vertically and horizontally to permit the wiring of the incoming lines to the connecting units or blocks, the wiring of the jumpers between these blocks and the distribution strips, and the wiring of the outgoing lines extending from said strips to the automatic switching device.

DESCRIPTION OF THE PRIOR ART

In a known distributor of this type, the vertical lines or rows of connecting blocks for the incoming lines are disposed at the lower portion of the distributor and extend over about one-half of the height thereof. The horizontal lines or rows of distribution strips are located at the upper portion of the distributor, above the lines of connecting blocks. As a result, the surface area occupied by the front face of this distributor is relatively large and the jumpers necessary for interconnecting the connecting blocks and the corresponding strips are relatively long, so that the complete wiring is particularly bulky and close. As a result, it is relatively awkward for a single operator facing the front face of the distributor to connect new jumpers or remove some jumpers having become useless; furthermore, since all the strips are located at the upper portion of the distributor, a step-ladder is necessary for connecting or disconnecting the majority of the jumpers.

DESCRIPTION OF THE INVENTION

These and other inconveniences characterizing distributors according to the prior art are eliminated with the distributor accessible from a same and single face according to this invention. In fact, with this improved distributor it is possible, while preserving a same surface area for the front face, to substantially double its capacity. In fact, the length of the jumpers necessary for interconnecting the connecting blocks or units and the corresponding strips is relatively shorter than in the prior art devices. In addition, the accessibility for a single operator placed in front of the front face of the distributor is improved, notably for connecting new jumpers or removing other jumpers having become useless; moreover, notably in certain specific forms of embodiment, the complete wiring is less close and the access to the various portions of the distributor is much easier.

Finally, certain specific forms of embodiment of this invention provide the additional advantageous feature resulting from a modular structure permitting a gradual increment of the distributor capacity.

The distributor according to this invention comprises intervals reserved between at least some connecting blocks in all the vertical lines or rows of said blocks. The horizontal lines or rows of strips are located substantially in front of and level with said intervals, on the front vertical face of the distributor; the vertical lines of connecting blocks are disposed behind and parallel to this front face at a distance affording an easy access to these blocks for an operator placed in front of the front face of the distributor.

Without departing from the basic principles of this invention, the distribution strips could be substituted for the connecting blocks, and conversely the connecting blocks could be substituted for the distribution strips. In this case, the blocks would thus be aligned horizontally on the vertical front face of the distributor, said strips being disposed in vertical alignment behind and parallel to this front face. This alternative is also applicable to all forms of embodiment and to their modified versions described hereinafter in the present specification. Similarly, the front face of the distributor is generally plane but if desired a concave, convex and even circular shape may be given thereto.

As already mentioned in the foregoing, the provision of guideways particularly adapted for the purpose further improves the easy access to the rear portion of the distributor while unbinding the cable assembly. Thus, two vertical guideways are advantageously provided in close vicinity of, and along, each vertical line of connecting blocks or distribution strips. One guideway is intended for containing the incoming lines or the outgoing lines, and consists for example of an U-section member. The other guideway is adapted to incorporate the jumpers connecting the blocks to the distribution strips. On the other hand, a horizontal guideway also adapted to incorporate jumpers is advantageously disposed parallel to the front face of the distributor, between each line of distribution strips or connecting blocks, and the vertical lines of connecting blocks or strips.

According to certain forms of embodiment, a third vertical guideway is provided on one side of an parallel to the above-mentioned pair of vertical guideways for containing the outgoing lines or the incoming lines. These specific forms of embodiment may advantageous but not compulsorily comprise a horizontal guideway disposed across the first guideway, just above or preferably beneath the latter, for containing the outgoing lines or the incoming lines, respectively; this horizontal guideway may extend between the third vertical guideway and each horizontal line of strips, or connecting blocks, respectively, disposed in front of said third vertical guideway.

In other possible forms of embodiment, a second horizontal guideway is provided for containing the outgoint lines or the incoming lines, respectively; this second horizontal guideway is located in close proximity of, and parallel to, each horizontal strip line.

According to a modified version applicable to all the above-mentioned forms of embodiment, at least one horizontal guideway is provided across the first guideway, just above or beneath the latter, for containing jumpers; this cross guideway extends at least from the vertical guideway provided for containing likewise jumpers, and each horizontal line of strips or connecting blocks registering with said jumper-containing vertical guideway.

According to another modified version applicable to all the above-mentioned forms of embodiment, at least one of the vertical guideways corresponding to a vertical line of connecting blocks, or connecting strips, is disposed behind said vertical line, as seen from the front face of the distributor. According to a further modification, this at least one vertical guideway is disposed laterally to said vertical line.

Moreover, some of the above-mentioned forms of embodiment may advantageously have a modular structure. Thus, for instance, the distributor may consist of a frame structure adapted to be disposed vertically and to support at least one vertical line of connecting blocks or strips. This frame structure comprises at the location contemplated for each one of the interval provided between said connecting blocks or strips a support extending substantially horizontally and forwardly, this support carrying or being adapted to carry at its free end one or a plurality of connecting strips or blocks aligned horizontally across the support concerned. The latter advantageously constitutes at the same time one portion of the horizontal guideway parallel to the front face of the distributor and adapted to carry the jumpers. The vertical frame structure supports the corresponding vertical guideways.

BRIEF DESCRIPTION OF THE DRAWING

FIG. 1 Illustrates in perspective a fragmentary view of a first form of embodiment of the invention, given by way of example, and FIG. 2 is a view similar to FIG. 1 but showing another form of embodiment of the invention.

DESCRIPTION OF THE PREFERRED EMBODIMENTS

Referring first to FIG. 1, the distributor partially illustrated therein comprises a framework 1 which, in its operative position, is disposed vertically. This framework 1 comprises a leg 2 adapted to keep it in a vertical position, possibly side by side with other similar frameworks. This framework 1 carries a vertical line or row 3 of connecting blocks or units 4,5. Each block is adapted for example to pivot about vertical studs 7 carried by brackets 8 disposed at the two vertical ends of each block 4,5, respectively. Another portion of these brackets 8 is secured laterally to one wing of the U-section forming the framework 1. The open side of the U is directed forward, that is, towards the blocks 4,5.

This vertical line 3 comprises intervals E left between successive pairs of aligned blocks, for example. Registering with each interval E is a larger bracket 9 extending horizontally forward and consisting likewise of an inverted U-section. One wing 10 of this inverted U-section carries a supporting plate 11 carrying a horizontal stud 17 acting as a pivot pin to a pair of distribution strips 18,19 which are thus disposed at a certain distance from the front or outer end 20 of the corresponding bracket 9, to constitute a horizontal line of such strips 18 and 19. In the operative position, the front faces 21 of the distribution strips 18,19 constitute the front face of the distributor, and it is only in front of this face that the operator can place himself during a wiring operation. The vertical line 3 of connecting blocks 4,5 is thus disposed behind and parallel to this front face, therefore within easy reach for the operator standing in front of this front face.

Fitted to the lower portion of each connecting block 4,5 are return hooks 23 and 23', 24 and 24', respectively. These hooks are fastened to the outer face of the parallel wings of the U-section member constituting the framework 1, so as to extend at right angles therefrom, respectively. Thus, they lie in a plane located at the rear of the open side of the double U. Moreover, the hooks 23 and 23' are disposed at a lower level than the top face 25 of the corresponding bracket 9. The free end of hooks 23, 23', 24, 24' is advantageously oriented to the rear of the distributor. On the other hand, the two side wings of the inverted U-section constituting the support 9 comprise, at the free or outer end 20 of bracket 9, a pair of ear-like extensions 27,27'. Each ear 27,27' carries a hook 28,28' extending at right angles thereto. The free ends of these hooks 28,28' are directed toward the front face of the distributor, as clearly shown in FIG. 1. Thus, these hooks 28 and 28' are also disposed at a lower level than the top face 25 of the relevant bracket 9.

The procedure for wiring this distributor comprises the following steps: For instance, the cable 32 containing the incoming line wires emerges from the lower portion of the framework 1. This cable 32 is inserted into one of the guideways 33 consisting of one of the double U constituting the framework 1, and extends along the entire height of this framework 1. All the pairs of wires incorporated in this cable 32 are then connected to the various connecting blocks or units 4,5 of the vertical line 3. Thus, for example, the two line wires 34,35 of a subscriber's line penetrate through the front face (opposite the front face 36) of one of the connecting blocks 5; this block 5 may for instance be similar to one of the connecting blocks described and illustrated in the U.S. patent application Ser. No. 955,226; these wires 34,35 emerge in the form of jumpers 34', 35' from one of the lateral faces 37 of block 5; these jumpers are guided in turn in a suitable notch of a wire-guide 38 disposed vertically along and behind the block 5, then pass behind the hook 34 and are somewhat stretched vertically, for example downwardly, towards the hook 23 so as to pass likewise behind this hook 23. The same wires are subsequently bent forward and pass under the hook 28, then through a notch of the wire-guide 29 disposed horizontally at the upper portion of the rear face, i.e. opposite the front face 21, of the distribution strip 18. This strip may if desired be similar to one of the strips described and illustrated in the U.S. patent application Ser. No. 19,553. The jumpers 34',35' penetrate through the top face 40 of the corresponding strip 18 and have extensions in the form of wires 34", 35" constituting an outgoing line. These wires 34" and 35" pass through the notches of a horizontal wire guide 42 provided at the lower portion of strip 18 and subsequently penetrate horizontally through the inverted U-section constituting the bracket 9. A cross member 43 provided at the end 20 of this bracket 9 keeps these wires in an upper portion inside the bracket 9. These wires 34" and 35" eventually penetrate into the vertical guideway 44 formed by the second portion of the double U-section member constituting the framework 1. The same wires 34",35" of the outgoing lines are assembled in a cable 45 emerging for example from the upper portion of guideway 44 and connected to the automatic switching device (not shown).

The wiring operation may be further facilitated by causing each connecting block 4,5 to pivot through an angle of about 180° as shown by the arrow 46 about the studs 7. The rear face of the blocks is thus disposed at the front during the wiring operation, so that the operator can see this rear face and connect the wires 34 and 35 more easily. Similarly, when wiring the outgoing line wire 34" and 35" on the strip 18, it is possible to cause this strip 18 to pivot through an angle of about 180° about the stud 17, as shown by the arrow 47, the bottom face 41 of the strip thus facing the operator. The wires 34" and 35" are disposed above the cross member 43 for the two fold purpose of permitting this rotation and slackening the wires concerned.

The vertical line of hooks 23 and 24 constitutes a vertical guideway that can be used for the jumpers such as 34' and 35'. Similarly, each hook 23 and the hook 28 registering and substantially level therewith on the corresponding support or bracket 9 constitute a horizontal guideway for some of the jumpers; each guideway is disposed horizontally just beneath another horizontal guideway of which the upper face 25 of each bracket 9 is an integral portion; when a plurality of assemblies of the type illustrated in FIG. 1 are disposed side by side, all the faces 25 located at the same level constitute a horizontal guideway which will this extend parallel to the front face of each distributor, between each horizontal line of strips 18,19, and the vertical lines or rows 3 of connecting blocks 4,5. This guideway is used for supporting the jumpers when the latter are intended for coupling a connecting block incorporated in a certain vertical line of blocks to a strip supported by the framework of another vertical line. In this case, the jumpers 34' and 35'for example, after passing behind and beneath the hook 23, are directed horizontally (see arrow 50) over several top faces 25, then behind and beneath the hook 23' of the other framework 1 supporting the strip concerned; eventually, the jumpers 34' and 35' pass under the hook 28' of the corresponding bracket 9, fit in a notch of wire guide 29, and penetrate into the strip 18 or 19; the last section of the connection leading to the automatic switching device is accomplished as explained hereinabove.

With the advantageous but not compulsory guideway arrangement described hereinabove, it is clear that the horizontal guideway comprising the top faces 25 of the horizontal brackets 9 contains only jumpers disposed longitudinally in this guideway; under no circumstances can these jumpers cross the vertical jumpers disposed behind the hooks 24, 23 or 24', 23' since the latter are located behind the horizontal longitudinal guideway; likewise, the jumpers disposed in the longitudinal horizontal guideway cannot under any circumstances cross neither the jumpers passing under the hooks 23, 28 or 23', 28', nor the outgoing wires passing through the bracket 9, for these jumpers and outgoing wires are disposed beneath the horizontal longitudinal guideway. Thus, each guideway contains cables having only one orientation, these cables having therefore the smallest possible cross-sectional dimension and leaving the maximal free space therearound for facilitating the access to the various component elements of the distributor, notably for connecting or disconnecting the jumpers between the connecting blocks and the distribution strips.

A slightly less advantageous arrangement would consist in disposing the jumpers, along their path between hooks 23 and 28, or 23' and 28', across the horizontal longitudinal guideway, and/or causing the jumpers possibly passing behind the hooks 24 and 23 to cross the jumpers enclosed in said horizontal longitudinal guideway. This arrangement would obviously be less satisfactory then the preceding one, but yet it would still afford a sufficient access to the various elements of the distributor.

According to a modified version of this specific form of embodiment, the connecting blocks are substituted for the strips 18,19 and the strips are substituted for the connecting blocks 4,5. Thus, the cable 45 will comprise the incoming lines and the cable 32 will contain the outgoing lines, the wiring proper remaining unchanged.

It will be seen that the specific form of embodiment and the modified version just described are advantageous in that they are modular assemblies. In fact, it is possible to add gradually other assemblies of the type shown in FIG. 1 besides those already constituting the distributor, so that the capacity of this distributor can be increased progressively.

FIG. 2 illustrates another possible form of embodiment of the distributor according to this invention, which comprises a number of frameworks 53,53', 53" ... consisting of U-section members open at the front and similar to the frameworks 1 described hereinabove, except that in this modified embodiment they form a single vertical guideway 33. Each framework 53,53',53" thus supports a vertical line of connecting blocks 5. An interval is left between each pair of adjacent blocks 5 to provide room for a bracket 9' similar to the brackets 9 of the preceding form of embodiment. The free or outer ends of these brackets 9' lie at a same level and support an U-section member 54 opening toward the front (see FIG. 2). Strips 18 are secured in front of the aperture of each section member 54 and therefore constitute a horizontal line or row of strips 55,55', ... on the front face of the distributor.

A metal plate 56, 56' is laid for example upon the brackets 9' disposed at a same level, above the guideway consisting of the corresponding U-section member 54; each plate 56,56' ... constitutes a horizontal longitudinal guideway adapted to carry the jumpers. Hooks 63,63' are substituted for the hooks 23,23' of the preceding form of embodiment. They have substantially the same position as the latter and are only disposed at a slightly higher level so as to overlie the guideways 56,56' ... The same applies to the hooks 68,68' substituted for the hooks 28,28' of the preceding form of embodiment; they are supported by lugs 67 and lie likewise slightly above each guideway 56. All the other component elements of the assembly are identical with those of the first form of embodiment described hereinabove with reference to FIG. 1.

Most of the wiring required for this distributor is arranged as in the first form of embodiment. Thus, each cable 32 containing the incoming line wires is directed towards the lower portion of each framework 53,53',53" ... , and is fitted into the corresponding vertical guideway 33 consisting of the framework section member. For example, the wires 74,75 of an incoming line emerging from the cable 32 housed in the framework 53 are connected to the rear face of one of the connecting units or blocks 5 (FIG. 2). Their extensions, beyond these blocks 5, consist of jumpers 74', 75' issuing from the relevent block 5 through a lateral face 64 thereof, and pass through corresponding notches 38 of the wire guide already mentioned hereinabove, behind a first hook 63, then behind a first guideway 56, behind and beneath a second hook 63 disposed level with the guideway 56', and follow this guideway 56' in the direction of the arrow 50. The jumpers 74', 75' subsequently pass behind and around a hook 63' carried by the framework 53', in front of which is the strip 18 to which they are to be connected. Said jumpers pass through the guideway 56', then beneath and in front of the corresponding hook 68', through suitable notches 29 of the corresponding wire guide, and eventually penetrate through the top face 40 of the strip 18. These jumpers 74', 75' have extensions in the form of wires 74", 75" of the corresponding outgoing line, which emerge from the bottom face 41 of strip 18, pass through notches 42 of the relevant wire guide, and are eventually directed to the cable 45 assembling the lines issuing from the horizontal row 55 of strips 18. This cable is fitted into the U-section member 54 and emerges laterally at the opposite end of the distributor.

As in the case of the first form of embodiment described hereinabove, the connecting blocks 5 are pivotally mounted about studs 46 and the distribution strips 18 are also pivoted about studs 47 in order to facilitate the wiring operation.

According to a modified version of this second form of embodiment, the connecting blocks or units are substituted for the strips 18 and conversely the strips occupy the positions of the connecting blocks 5. The horizontal cable 45 encloses the incoming line wires and the vertical cable 32 encloses the outgoing lines. Otherwise, the wiring is unchanged.

The distributor according to this invention may be used notably whenever a relatively high degree of line density is desired or necessary.

What is claimed is:

1. A telephone exchange distributor accessible from one side only, namely the front face, which comprises lines of connecting blocks for incoming subscribers' lines, disposed vertically, and lines of distribution strips, disposed horizontally, or vice versa, guideways provided vertically and horizontally, to permit the wiring of the incoming lines to said connecting blocks, the wiring of the jumpers between said blocks and said distribution strips, and wiring of outgoing lines issuing from said strips and leading to automatic switching device of the telephone exchange, wherein intervals are provided between at least some of said connecting blocks or some of said strips of all the vertical lines, said horizontal lines of strips or connecting blocks being disposed substantially in front of and level with said intervals on the vertical front face of said distributor, the vertical lines of connecting blocks, or strips, being disposed behind said front face and parallel thereto.

2. A telephone exchange distributor accessible from one side only, namely the front face, according to claim 1, wherein two vertical guideways are disposed in close proximity, and along each vertical line of, connecting blocks, or strips, one guideway being intended for containing the incoming lines or the outgoing lines, and the other for containing the jumpers, a horizontal guideway to contain jumpers, being disposed parallel to the front face of the distributor between each horizontal line of strips or connecting blocks, and the vertical lines of connecting blocks, or strips respectively.

3. A distributor according to claim 2, which comprises, besides the two vertical guideways disposed in close proximity of and parallel to each vertical line of connecting blocks or strips, a third vertical guideway to enclose the outgoing lines or the incoming lines.

4. A distributor according to claim 2, wherein a second horizontal guideway is provided for containing the outgoing lines or the incoming lines, which is disposed in close proximity of and parallel to each horizontal line of strips, or connecting blocks.

5. A distributor according to claim 3, wherein an additional horizontal guideway, disposed transversely across said first horizontal guideway is provided for containing the outgoing line or the incoming lines, said transverse horizontal guideway extending between said third vertical guideway and each horizontal line of strips or connecting blocks registering with said third vertical guideway.

6. A distributor according to claim 5, which comprises at least one horizontal guideway disposed across the first horizontal guideway, just above or just beneath the latter, and adapted to contain jumpers, said transverse horizontal guideway extending at least from said vertical guideway adapted to contain likewise jumpers and each horizontal line of strips, or connecting blocks, registering with said jumper-containing vertical guideway.

7. A distributor according to claim 6, wherein at least one of said vertical guideways corresponding to a vertical line of connecting blocks or strips is disposed behind said vertical line as seen from the front face of the distributor.

8. A distributor according to claim 7, wherein at least one of said vertical guideways corresponding to a vertical line of connecting blocks or strips is disposed laterally to said vertical line as seen from the front face of said distributor.

9. A distributor according to claim 8, which comprises a framework adapted to be disposed vertically for supporting at least one vertical line of connecting blocks or strips, which comprises, at the location of each one of said intervals formed between some of said connecting blocks or strips, a bracket extending substantially horizontally and forwardly, a free end of said bracket carrying or being adapted to carry one or a plurality of strips, or one or a plurality of connecting blocks, aligned horizontally and across said bracket, said bracket constituting one portion of the horizontal guideway provided for supporting the jumpers, the vertical framework supporting the corresponding vertical guideways.

* * * * *